United States Patent
Kovach et al.

(10) Patent No.: US 8,205,306 B2
(45) Date of Patent: Jun. 26, 2012

(54) ZIPPER PULL REPAIR APPARATUS

(76) Inventors: Frank Gerald Kovach, Glen Allen, VA (US); Brian Eugene Cook, Glen Allen, VA (US)

( * ) Notice: Subject to any disclaimer, the term of this patent is extended or adjusted under 35 U.S.C. 154(b) by 109 days.

(21) Appl. No.: 12/501,448

(22) Filed: Jul. 12, 2009

(65) Prior Publication Data

US 2011/0005043 A1    Jan. 13, 2011

(51) Int. Cl.
*A44B 19/26* (2006.01)
(52) U.S. Cl. .............................. 24/429; 24/598.5; 59/88
(58) Field of Classification Search .................. 24/429, 24/592.1, 598.4, 599.1, 601.7; 59/85, 87, 59/88
See application file for complete search history.

(56) References Cited

U.S. PATENT DOCUMENTS

| | | | | |
|---|---|---|---|---|
| 30,632 A | * | 11/1860 | Kirk | 59/88 |
| 324,637 A | * | 8/1885 | Barnes | 59/88 |
| 446,317 A | * | 2/1891 | Bailey | 59/88 |
| 581,250 A | * | 4/1897 | McCawley | 24/598.6 |
| 588,976 A | * | 8/1897 | Gatewood | 59/88 |
| 751,614 A | * | 2/1904 | Cotten | 59/88 |
| 955,070 A | * | 4/1910 | Honabach | 59/78 |
| 1,151,246 A | * | 8/1915 | Criswell | 59/88 |
| 1,249,241 A | * | 12/1917 | Sunderland | 24/582.13 |
| 1,252,184 A | * | 1/1918 | Schreyer | 59/88 |
| 1,262,974 A | * | 4/1918 | Pearen | 24/598.5 |
| 1,326,395 A | * | 12/1919 | Duryea | 59/88 |
| 1,402,868 A | * | 1/1922 | King | 59/85 |
| 1,494,754 A | * | 5/1924 | Molony, Jr. | 24/599.1 |
| 1,601,290 A | * | 9/1926 | Brighouse | 59/88 |
| 1,754,042 A | * | 4/1930 | Port | 59/87 |
| 1,979,069 A | * | 10/1934 | Hancock | 59/88 |
| 2,209,475 A | * | 7/1940 | Rawlings | 24/598.6 |
| 3,144,748 A | * | 8/1964 | Knop | 59/88 |
| 3,545,049 A | * | 12/1970 | Brueggeman | 24/598.5 |
| 3,590,443 A | * | 7/1971 | Kubsch | 24/13 |
| 3,911,671 A | * | 10/1975 | Guillen | 59/89 |
| 4,376,383 A | * | 3/1983 | Wolter | 70/456 R |
| 4,411,050 A | * | 10/1983 | Couture | 24/598.5 |
| 4,512,064 A | | 4/1985 | Nishikawa | |
| 4,918,794 A | | 4/1990 | Harvey et al. | |
| 5,860,192 A | | 1/1999 | Chung | |
| 5,979,021 A | * | 11/1999 | Swift | 24/66.6 |
| 6,035,497 A | | 3/2000 | Jackson | |
| 6,240,604 B1 | | 6/2001 | Fox | |
| 6,243,922 B1 | * | 6/2001 | Simon | 24/3.6 |
| 6,412,152 B1 | * | 7/2002 | Ayliffe et al. | 24/598.5 |
| 6,510,593 B1 | * | 1/2003 | Kim | 24/418 |
| 6,560,829 B1 | | 5/2003 | Chen | |
| 6,804,867 B2 | | 10/2004 | Oda | |
| 7,117,567 B1 | | 10/2006 | Krulik | |
| 7,213,306 B2 | | 5/2007 | Medsker | |
| 2005/0108860 A1 | * | 5/2005 | Crane et al. | 24/329 |
| 2007/0124901 A1 | * | 6/2007 | Cyr et al. | 24/429 |

* cited by examiner

*Primary Examiner* — Robert J Sandy
*Assistant Examiner* — Rowland D Do
(74) *Attorney, Agent, or Firm* — David Quinn PLC

(57) ABSTRACT

The present invention discloses a single-part zipper pull comprised of two rotatable halves secured together on a pin. On one end of the zipper pull is a handle by which fingers can grasp the pull. On the other end of the zipper pull are clasps to latch to the zipper slider. The complete clasp is made up of the two J hooks, one on each half. The handle is made complete by rotating the two halves of the zipper pull together. In the open position, the J hooks have a gap by which to engage the zipper slider crown. In the closed position, the clasps come together making a complete loop thereby securing to the zipper slider crown. Once the zipper pull tab is closed, a latch and receiver engage to prevent the two halves from rotating to an open position.

3 Claims, 6 Drawing Sheets

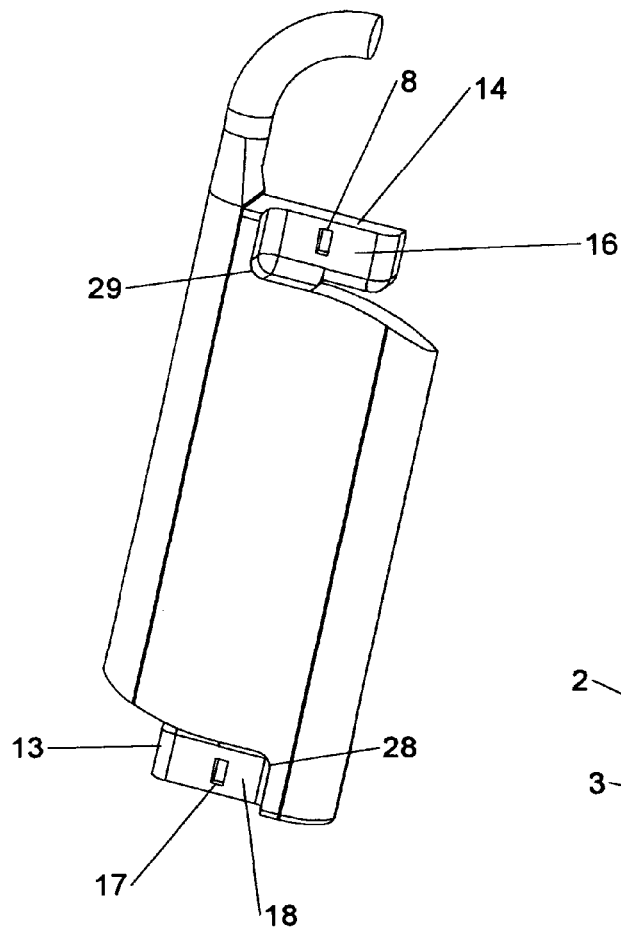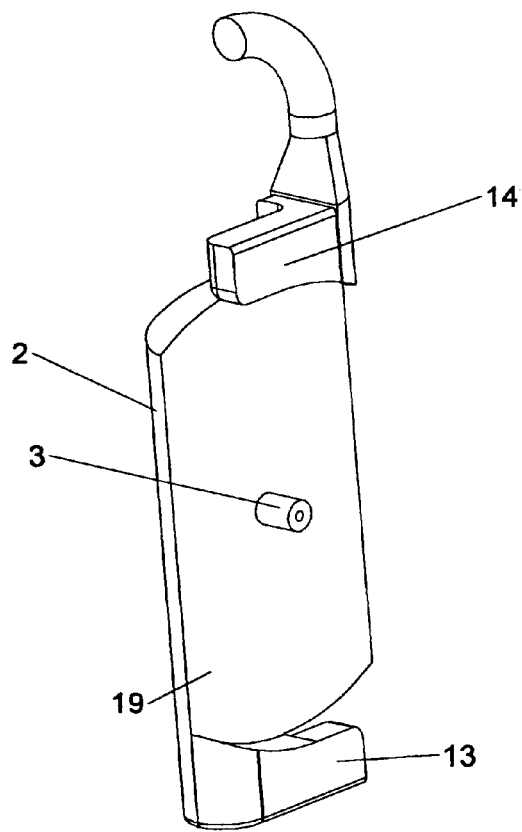
FIG. 5A
FIG. 5B

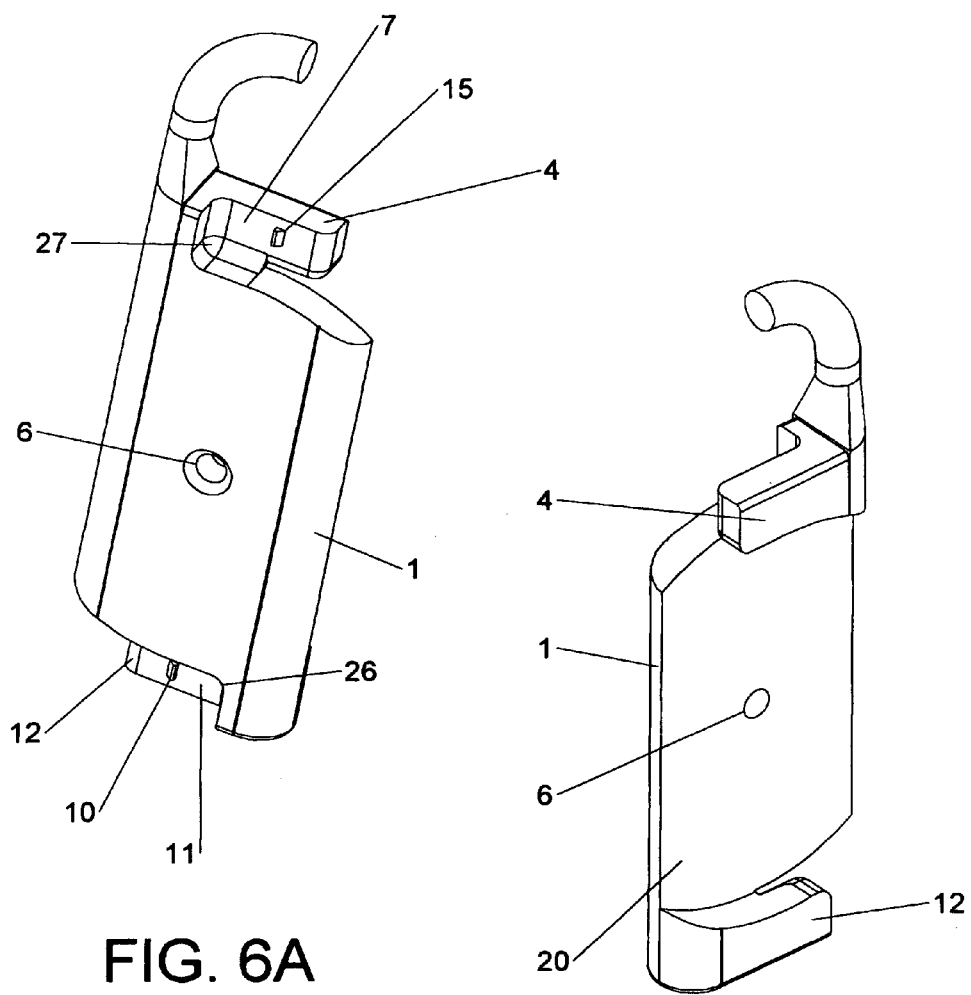

ZIPPER PULL REPAIR APPARATUS

CROSS-REFERENCE TO RELATED APPLICATIONS

| | | |
|---|---|---|
| 4,512,064 | April 1985 | Nishikawa |
| 4,918,794 | April 1990 | Harvey et al |
| 5,860,192 | January 1999 | Chung |
| 6,035,497 | March 2000 | Jackson |
| 6,240,604 B1 | June 2001 | Fox |
| 6,560,829 B1 | May 2003 | Chen |
| 6,804,867 | October 2004 | Oda et al |
| 7,117,567 B1 | October 2006 | Krulik |
| 7,213,306 B2 | May 2007 | Medsker |

STATEMENT REGARDING FEDERALLY SPONSORED RESEARCH OR DEVELOPMENT

Not applicable.

FIELD OF INVENTION

This invention relates to a zipper, more specifically to a zipper pull which can be quickly and permanently hand attached to a zipper slide in the event the original zipper pull has become broken or lost.

BACKGROUND OF INVENTION

Zippers can be found on many different objects: apparel, coats, jackets, shoes, camping gear, automobiles, boats, sporting equipment, luggage and anything one might open and close. In the course of daily events, the zipper pull may break off or separate from the slide. FIG. 1a shows the chain 23 and zipper slide 22 with no pull. The arm or crown of the slide is 21 and serves as the attachment point for the pull. In FIG. 1b, is a close up view of the slide 22, crown 21, and the chain 23. The crown is in tact but it is difficult to move the slider without the pull. One can insert a wire or string into the crown 21 to serve as a pull and operate the zipper. This solution presents an unattractive or objectionable appearance to the apparel or object.

The zipper pull repair apparatus provides a quick and easily attachment solution for this type zipper pull failure. This invention requires no tools to affix the pull to the zipper slide and also comes in an attractive appearance similar to the original zipper pull. FIG. 2a shows the zipper pull being affixed to the crown of the zipper slide. The j hooks 5 and 9 on the zipper pull are secured to the crown 21 of the zipper slide 22 by squeezing the zipper pull body together. In FIG. 2b, once together, the pull can not be removed, it becomes permanently attached to the crown of the slide providing an attractive and effective means of operating the zipper.

The prior art associated with the zipper mechanism is well established. There are numerous patents over the past 90 years describing the elements of the zipper: coils, chains, slides, catches, and pulls. There are numerous patents relating to the construction of this zipper mechanism. As the zipper mechanism evolved, there is prior art relating to attaching decorative parts to the end of the zipper pull and means of affixing decorative parts to the pull. U.S. Pat. No. 4,918,794 to Harvey et al is a good example of this decorative attachment to the pull. This patent pertains to attaching an elastic decorative part to the zipper pull rather than to the replacement of a pull due to the breakage of the pull. There are a number of patents that address the zipper pull breakage.

Patents related specifically to replacing the broken zipper pull as in our invention are referenced. In U.S. Pat. Nos. 6,035,497 to Jackson, and 7,117,567 to Krulik both provide a solution whereby parts of the zipper pull are pinned together and attached to the slide.

U.S. Pat. No. 6,035,497 provides a zipper pull tab with a frangible component thereby protecting the zipper slide and coils from damage. This is not the intent of our solution. U.S. Pat. No. 7,117,567 provides a repair solution using 3 parts. There is far too much complexity in assembling 3 very small parts. The intent of our invention was to provide a solution that a person could assemble at an airport, bus terminal, train station, camping, sporting event or at home with ease.

In U.S. Pat. No. 6,240,604 to Fox, there is a spring attached zipper pull made of a wire. This is an excellent solution to the problem where it is convenient and easy to install however it lacks visual appeal. The wire is similar to attaching a paperclip to a broken pull. The sleeve that goes over the wire zipper pull improves the appearance however the complexity goes up. Now you have 2 separate parts that you have to assemble. The intent of our invention is to provide a one piece solution.

In U.S. Pat. No. 7,213,306 to Medsker, a solution is provided similar to the key ring. Coils of wire are wound like a key ring with a single loop for the attaching to the slider. It is difficult to install this solution and the visual appearance is again similar that of a paperclip. Additional parts can be installed into the loops with improves the visual appearance but again the number or separate parts goes up and thus inconvenience.

In U.S. Pat. No. 6,560,829 to Chen, this is a one piece solution in which a pliable tough plastic zipper pull is installed into the slider and is pinched together on a barb element in the body of the tab. A zipper pull has to be small in order to mate to zipper sliders. When parts of the pull are small, they tend to be weaker and are prone to breakage. Our zipper pull tab is made from the same material as the original pull tab. Although a great solution, U.S. Pat. No. 6,560,829 may suffer from breakage during use. Also being made from a pliable tough plastic lacked the visual appeal.

BRIEF SUMMARY OF INVENTION

The primary objective of this invention is to provide a convenient easy to install zipper pull tab which could be secured while at an airport, bus terminal, train station, camping, sporting event or at home. We also wanted a pull tab that had a visually attractive appearance equal to the original zipper pull. Lastly we wanted a simple repair solution with only one part requiring no tools to affix the pull. The above objectives of this invention are accomplished by having a scissor-like zipper pull body which attaches to the zipper slide by 2 J hooks. The body of the zipper pull is comprised of 2 halves which are secured together at a pivot point in the middle of the bodies. At one end of the pull are J hooks which when closed make a complete circle to attach to the zipper slider. Also in this closed position, there is a latch which prevents the zipper pull tab from being reopened. The zipper pull, when installed on a zipper slide would be permanently attached.

BRIEF DESCRIPTION OF THE SEVERAL VIEWS OF THE INVENTION

FIG. 5 shows a perspective view of ½ of the zipper pull, pin side.

FIG. 6 shows a perspective view of ½ of the zipper pull, hole side.

DETAILED DESCRIPTION OF THE INVENTION

FIGS. 3-6 show a complete embodiment of the zipper pull invention in both an open and closed positions and as individual components. The zipper pull will be described starting from pin 3 and working out to the ends of the pull.

Figure 3:
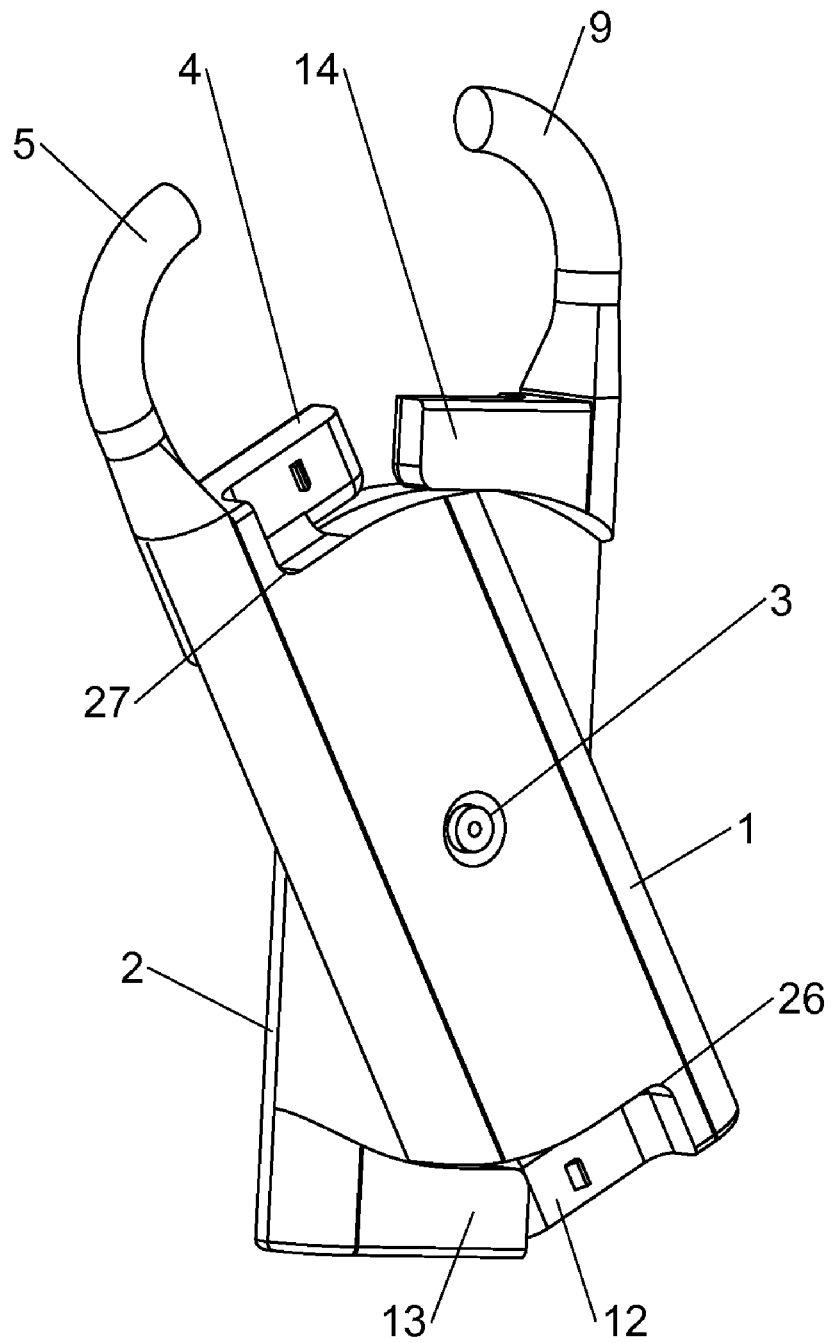
FIG. 3 shows a perspective view of the zipper pull in its open position.

On FIG. 3, the zipper pull is comprised of two main bodies, hole body 1 and pin body 2 attached together at pin 3. Hole body 1 and pin body 2 can freely rotate about each other upon pin 3. Pin 3 is made as part of pin body 2. The free end of pin 3 is peened over and made larger so hole body 1 can not be removed from pin body 2 once the two are mated. The preferred construction of these parts is a zinc die cast similar to how a zipper pull is currently made. Other materials such as titanium, aluminum, and steel would be considered. When considering steel, a stamped method of construction could be employed.

An upper latch arm 4 and a lower latch arm 12 are made onto hole body 1. An upper latch arm 14 and lower latch arm 13 are made onto pin body 2. Pin body 2 and hole body 1 in the open position have pockets 26 and 27 on hole body 1 and 28 and 29 on pin body 2 for receiving the latch arms on the opposing bodies as shown in FIGS. 5 and 6. When in the closed position, the arms reside in the pockets and make a complete pull body as seen on FIG. 4.

On FIG. 5, pin body 2 has an upper receiver arm 14 and a lower receiver arm 13. On the upper receiver arm face 16 is an upper recess 8 to receive a ramped protrusion from the opposing body. On the lower receiver arm face 18 is the lower recess 17.

Figure 4:
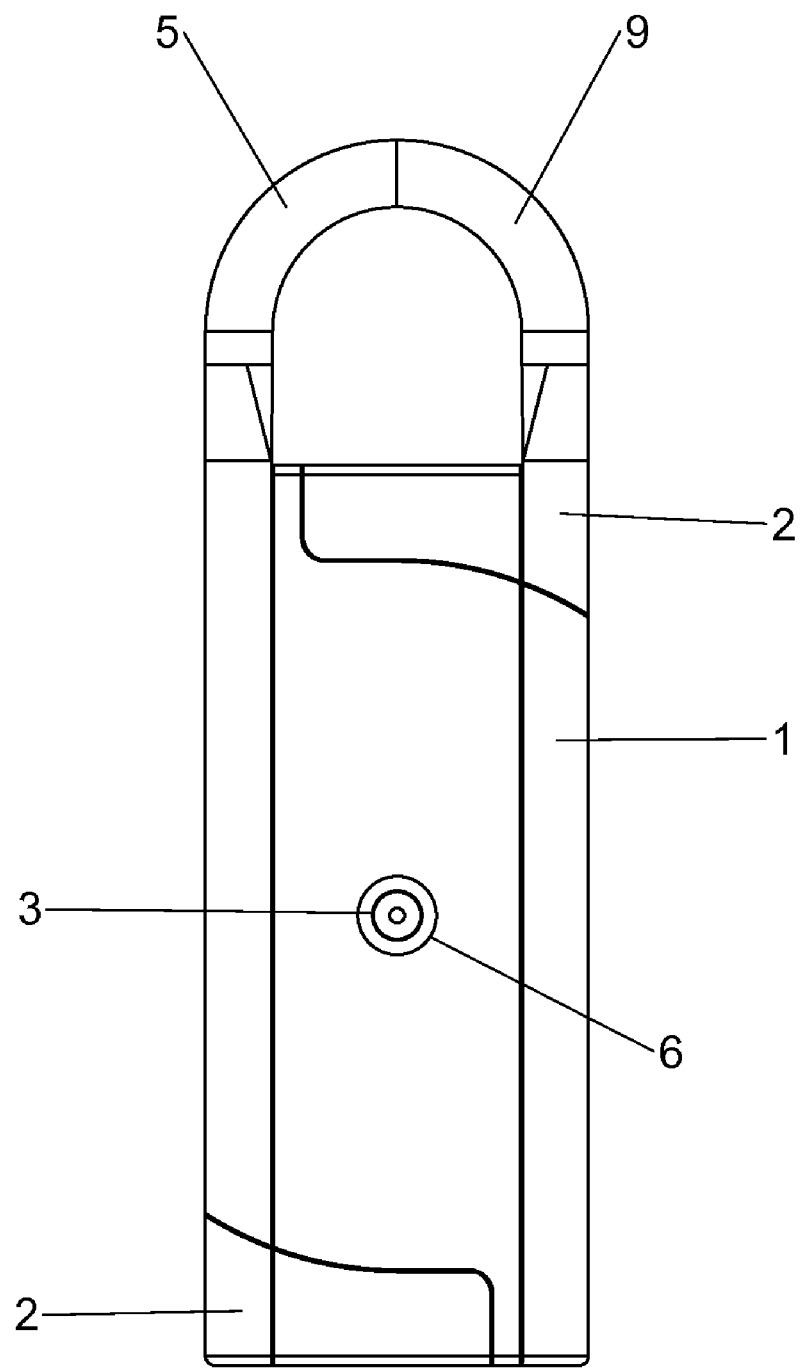
FIG. 4 shows a perspective view of the zipper pull in its closed position.

On FIG. 6a, hole body 1 has an upper latch arm 4 and a lower latch arm 12. On the upper latch arm face 7 is ramped protrusion which resides in the upper recess 8 in FIG. 5 when in the closed position. This is the upper latch or protrusion 15. On the lower latch arm face 11 is the lower latch 10. The protrusions on either latch are ramped so that when closing the zipper pull, the protrusions slide easily into the recesses 8 and 17 on the opposing body. The non ramped side of the protrusion prevents opening of the zipper pull and thus providing a locked state. FIG. 4 is in the locked close state.

The upper latch arm face 7 and upper receiver arm face 16 bear against each other the same as the lower latch arm face 11 and lower receiver arm face 18. The flat face surrounding the pin 3 is 19 and the flat face surrounding the hole 6 is 20. Faces 19 and 20 bear against each other and force the other faces to bear against each other as well. This action keeps the latches in place on both of the upper and lower arms. It takes the force off of pin 3 to keep the both bodies together and aligns and stabilizes the two mating parts.

Figure 1A:
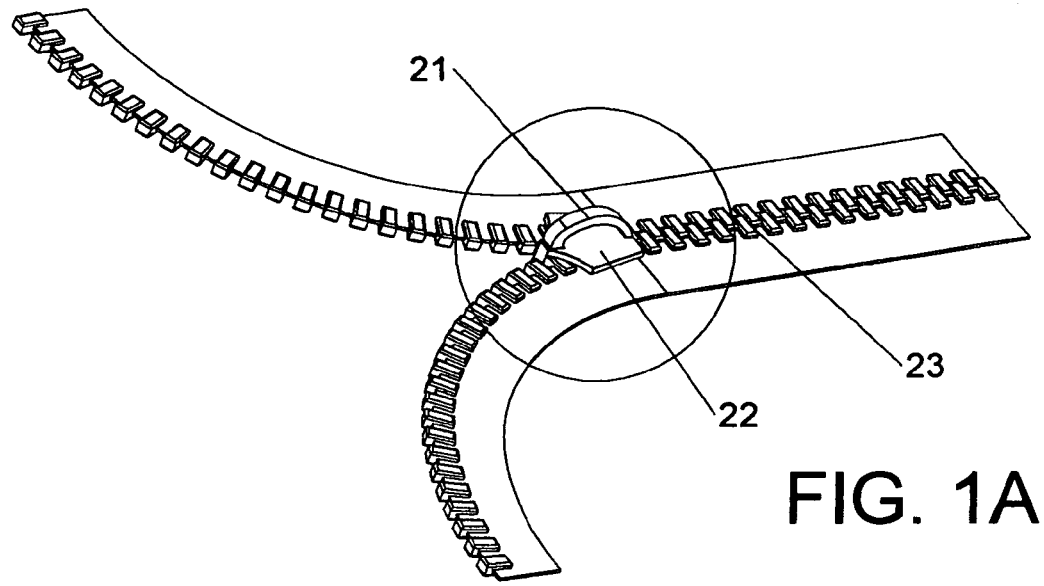
FIG. 1a shows a perspective view of a zipper with zipper crown according to an aspect of the present invention.
Figure 1B:
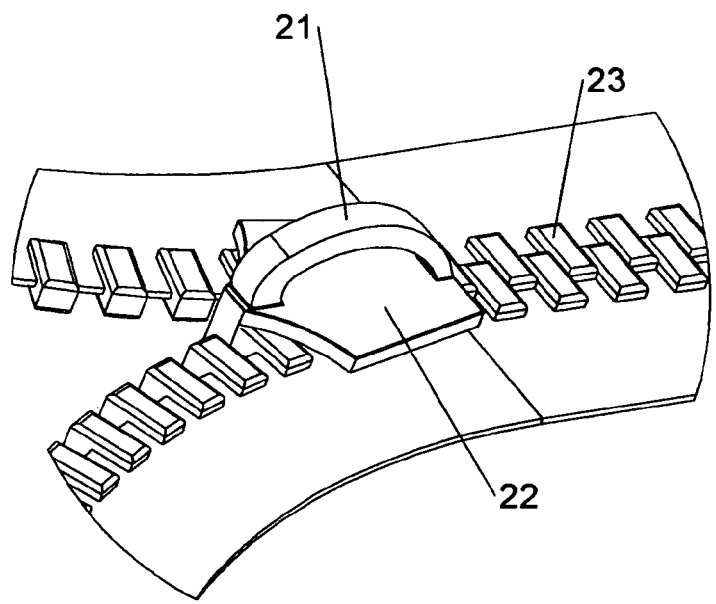
FIG. 1b shows a perspective view of a zipper with zipper crown according to an aspect of the present invention.
Figure 2A:
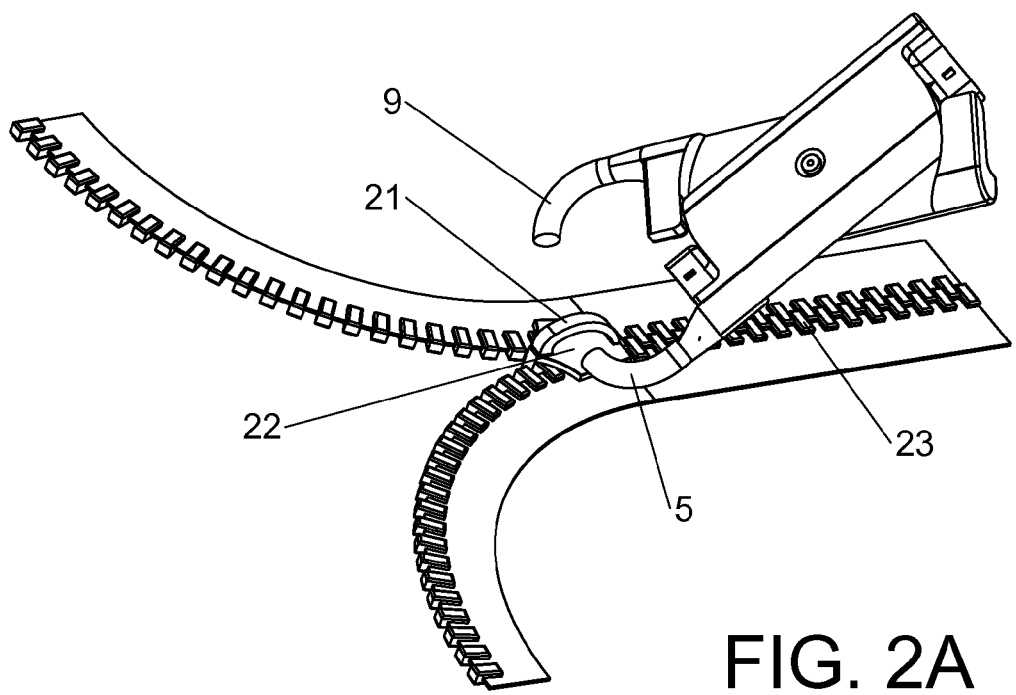
FIG. 2a shows a perspective view of the zipper pull in its open position positioned relative to a zipper crown.
Figure 2B:
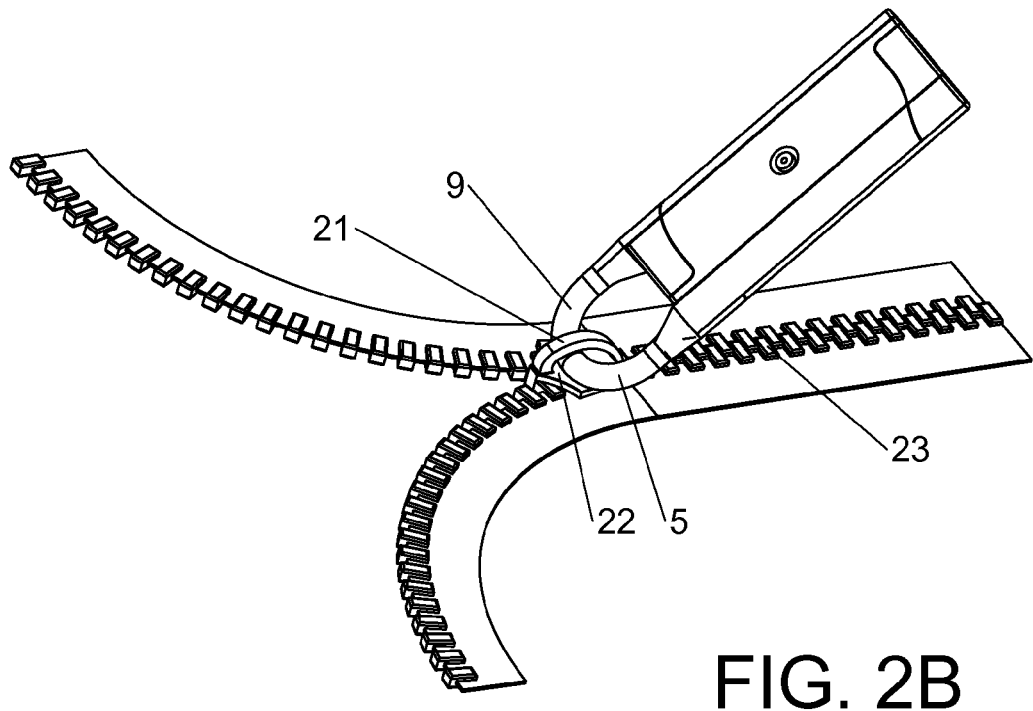
FIG. 2b shows a perspective view of the zipper pull in its closed position positioned relative to a zipper crown.

There are J-hooks on both bodies which are for the purpose of clasping the crown of the zipper slider. On FIG. 3, J hook 5 and J hook 9 when closed, come together making a complete enclosed clasp that surrounds the arm of the crown 21 on zipper slide 22 in FIGS. 1a and 1b. FIG. 2a shows this action of clasping the zipper pull to the slide. FIG. 2b shows the attached zipper pull to the slide. Once the pull is in the position indicated in FIG. 2b, the ramped latch described above prevents the zipper pull from being removed

We claim:

1. A zipper pull, comprising:
a first opposing body and a second opposing body pivotally connected at a pin point, each of the first opposing body and the second opposing body comprising an end from which extends a J-hook projection wherein the first body and the second body are being pivotable from an opened position to a closed position;
the first opposing body further comprising two recesses;
the second opposing body further comprising two protrusions; and
wherein the first opposing body and the second opposing body permanently enter the closed position that prevents the zipper pull from being reopened in which the two protrusions interlock by interference with the two recesses and the J-hook projections form a closed loop.

2. The zipper pull of claim 1 wherein the closed loop lies in a plane perpendicular to an axis of rotation of the pin point.

3. The zipper pull of claim 1 wherein each of the two protrusions comprise a ramped edge and a non-ramped edge.

* * * * *